Aug. 3, 1954  S. WARREN  2,685,314
POTATO PLANTER ATTACHMENT HAVING A ROTARY CUTTING WHEEL
Filed Aug. 31, 1950  3 Sheets-Sheet 1

Inventor
Scott Warren

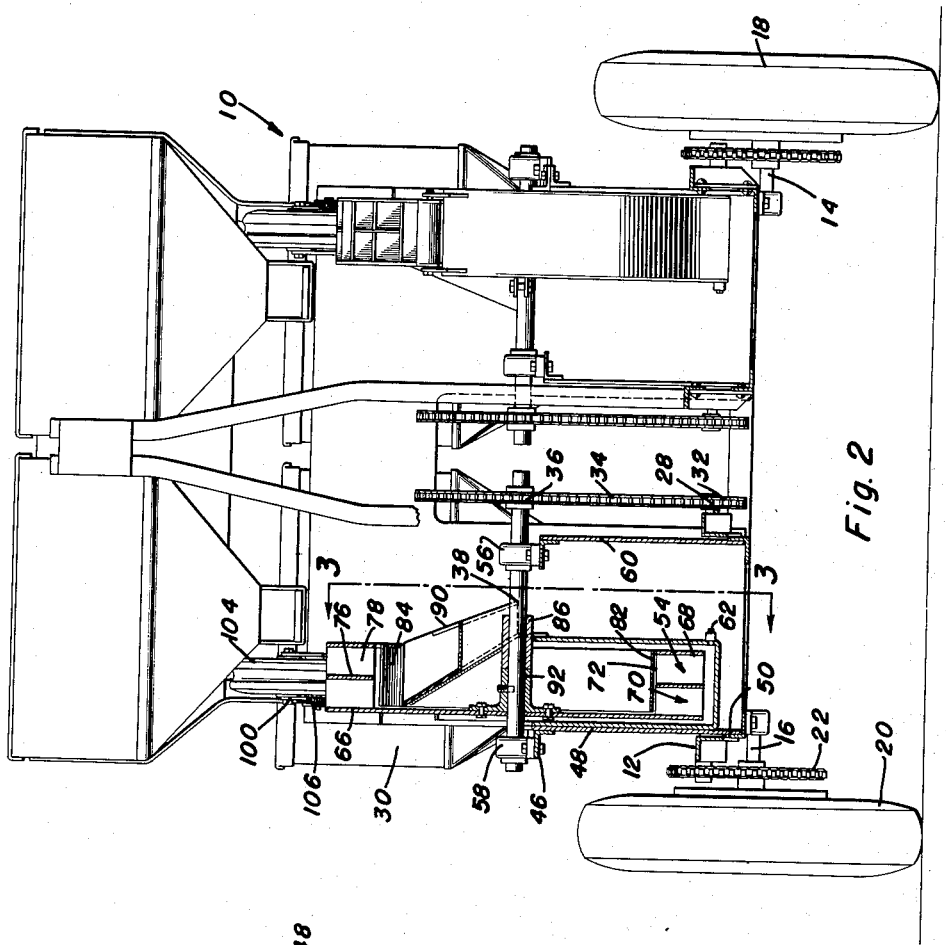
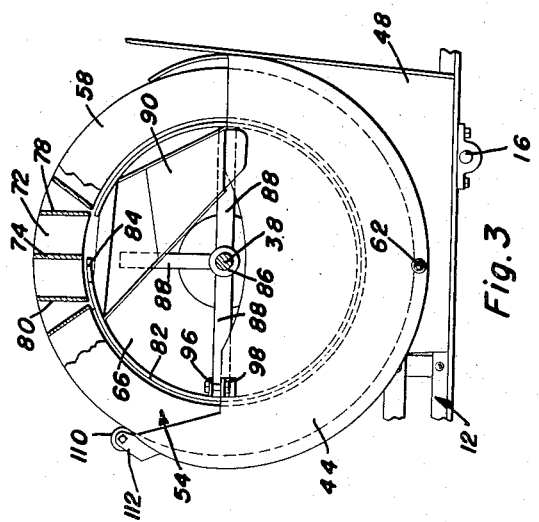

Inventor
Scott Warren

By *Clarence A. O'Brien
and Harvey B. Jacobson*
Attorneys

Patented Aug. 3, 1954

2,685,314

UNITED STATES PATENT OFFICE 2,685,314

POTATO PLANTER ATTACHMENT HAVING A ROTARY CUTTING WHEEL

Scott Warren, Klamath Falls, Oreg.

Application August 31, 1950, Serial No. 182,508

5 Claims. (Cl. 146—57)

This invention relates to improvements in an attachment for a standard potato planter.

It is the primary object of the present invention to provide an attachment which may be applied to any standard planter, said attachment having a simple structure capable of cutting, preferably quartering, seed potatoes, the quartered potatoes being dipped prior to the discharge thereof.

Ancillary objects and features of importance will become apparent in following the description of the illustrated form of the invention.

In the drawings:

Figure 2 is a transverse sectional view of the structure in Figure 1;

Figure 3 is a sectional view taken substantially on the line 3—3 of Figure 2 and in the direction of the arrows, portions being omitted, and;

Figure 1:
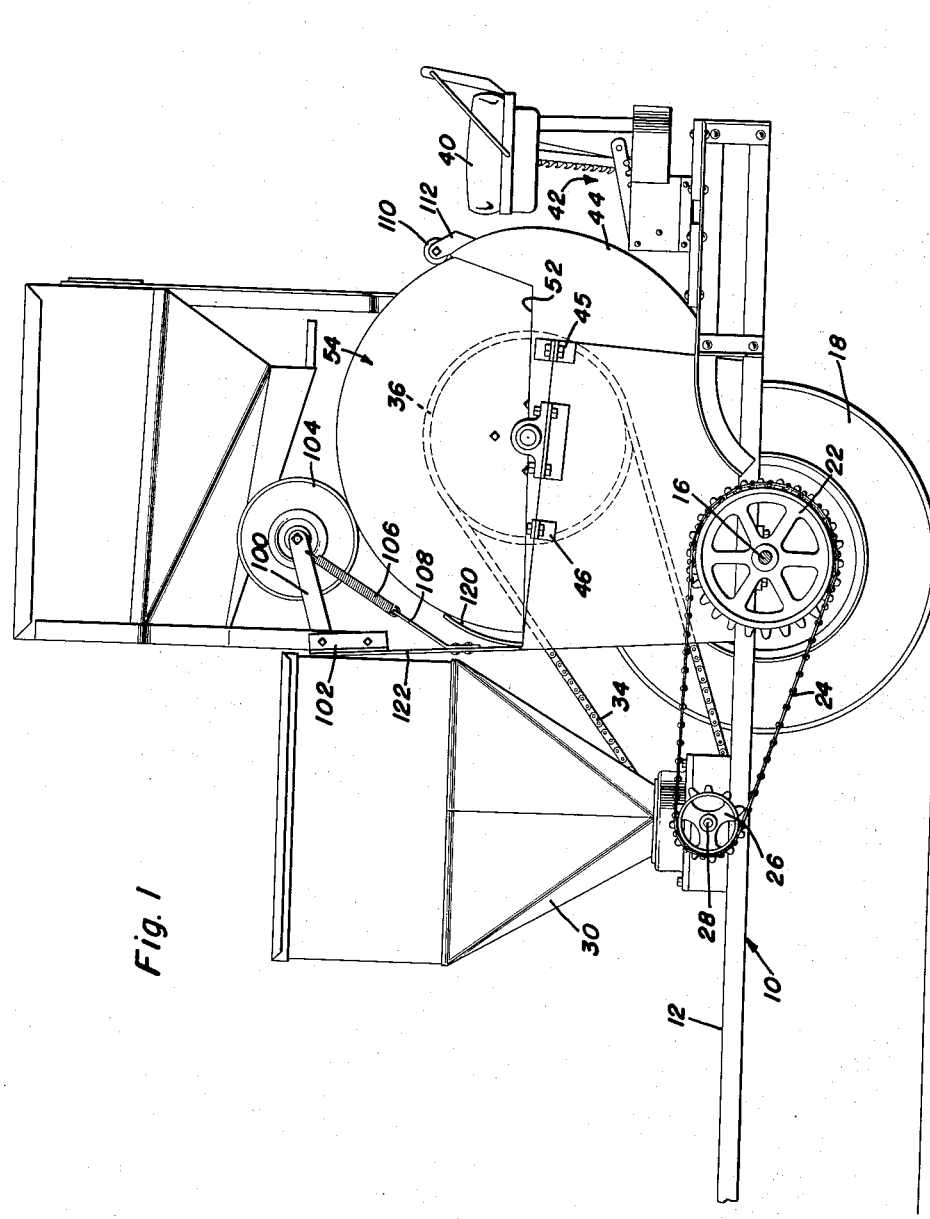
Figure 1 is an elevational view of a standard potato planter with the attachment mounted thereon.

The instant device is one which may be considered as an attachment for use on a standard potato planter or as an integral part of a potato planter. When the attachment is applied to a conventional planter the planter is used in its original state for the purpose of obtaining a drive and distributor of fertilizer as is normal with a potato planter of conventional description.

The planter generally indicated at 10 is provided with a main frame 12 to which the axles 14 and 16 are attached. Wheels 18 and 20 are mounted on the axles in order to support the frame. In the illustrated instance there are two attachments applied inasmuch as the planter is of the type which may accommodate two attachments. Considering only one of these attachments in detail, the wheel 20 actuates the sprocket 22 which is driven by the wheel and a chain 24 is entrained around the sprocket. This chain operates a sprocket wheel 26 which is connected to a horizontal shaft 28. This horizontal shaft is a standard element of a potato planter and is used for fertilizer distribution from the hopper 30 by means of unshown structure such as standard agitators.

A sprocket 32 is fixed to the shaft 28 and has a chain 34 connected therewith, which chain extends also around a sprocket wheel 36 this sprocket wheel being fixed to a shaft 38.

There is a seat 40 provided at the rear part of the planter and this seat is adjustably mounted by a standard adjusting mechanism 42. One seat is provided for each attachment inasmuch as in use of the device manual placing of the potatoes upon a series of plurality of knives defining pockets, is necessary.

A container or receptacle 44 (Figure 4) is mounted on a pair of brackets 46 and 48 respectively and is held in place by standard fasteners, for example bolts and nuts. These brackets are connected to a mounting plate 48 which is located on the structural framing member 50 of the frame 12 of the planter. The receptacle or container 44 is generally annular in shape, being provided with an open top 52. The shaft 48 is arranged to pass through the container 44 transversely of the container so as to mount the wheel 54 for rotation within the container. In supporting the shaft 38 standard pillow blocks 56 and 58 constituting bearings for the shaft are employed, one pillow block 56 being disposed on the bracket 60 and the other being disposed on the mounting plate 48. A drain plug 62 for the container 44 is located near the bottom thereof inasmuch as the container is adapted to hold a germicidal solution.

The wheel 54 is made of a back plate 66, circular in shape, and a circular collar or ring 68 held spaced from the plate or disk 66 by means of a series of knives 70. The knives are so arranged as to form potato quarter pockets 72. There is a transverse knife 74 intersecting a longitudinal knife 76 and there are transverse end knives 78 and 80 in a single group. This arrangement defines four pockets and the pockets have open bottoms.

Figure 4:
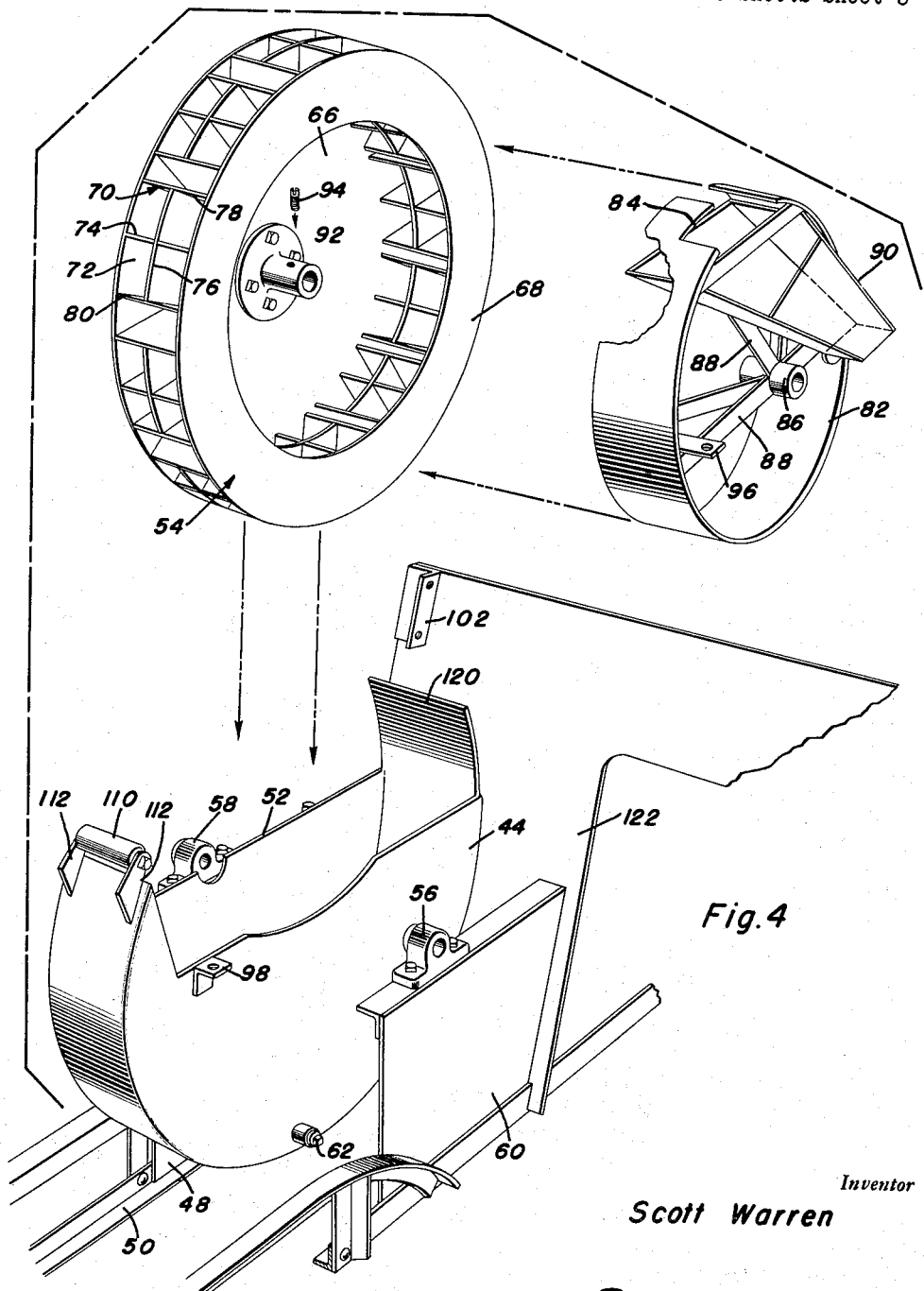
Figure 4 is an exploded perspective view of the attachment.

A cylinder 82 is disposed in concentric relationship with the wheel 54 and has an opening 84 therein. The hub bearing 86 shown in Figure 4 is held in place by means of the spokes 88.

A discharge spout 90 is connected to the sleeve or cylinder 82 and is arranged so that it has its inlet in communication with the opening 84.

The sleeve or cylinder 82 together with the spout 90 which is fixed thereto, is stationary, while the wheel 54 is mounted for rotation. Therefore, the hub bearing 92 which is fixed to the plate 66 of the wheel 54 is provided with a set screw 94 or other equivalent means, for example a key, in order to rigidly fix the wheel 54 to the shaft 38. In order to hold the sleeve or cylinder 82 fixed the strap 96 thereof is connected to the apertured support 98 by means of a bolt and nut assembly, the support 98 being carried by the container 44.

Attention is now invited to Figure 1. There is an arm 100 mounted on the frame piece 102 by means of a pivotal connection. At the outer end of the arm 100 there is a wheel 104 having a grooved pneumatic tire thereon to thereby constitute a resilient potato pressing element. The element 104 is located above the wheel 54 and has its periphery pressed against the knives thereof by means of the spring 106 which is attached at one end to the arm 100 and which is secured at the other end to a bracket 108 which is carried by a suitable framing member.

A roller 110 carried by the roller support brackets 112 which are mounted on the container 44, is arranged for final pressing of any residual seed potato which may be located near the upper edges of the knives or cutters.

In operation the standard planter 10 is drawn through a field by suitable motive force such as would be derived from a tractor. Inasmuch as at least one of the wheels of the planter has a driving connection with the shaft 28 to distribute fertilizer, and this shaft has a driving connection with wheel 54 motivating shaft 38, said wheel 54 is caused to rotate. The wheel 54 is so located that part of it projects through the open top or opening 52 of the container and, the container is arranged to hold a germicidal solution so that a part of the wheel is always submerged.

The farmer simply places or presses a seed potato upon the inner section of the cutters 74 and 76 of each group 70 while the wheel 54 is rotating at a position adjacent and above roller 110. They are carried upward until they are pressed down into the pockets 72 by the resiliently mounted and resilient element 104. Then, the part of the wheel having the quartered potatoes therein passes behind the scraper 120, which is formed as a part of the receptacle or which is attached to the receptacle 44. Upon further rotation the quartered potatoes are dipped into the fluid in the container 44 and are lifted due to the normal rotation. During their passage through the germicidal solution in the container, the quartered potatoes are retained in the container by the close contact of the periphery of the wheel 54 with the bottom of the container. All during this time the sleeve 82 constitutes a bottom for the pockets in which the potato portions are located. Then, these pockets pass under the final roller 110.

Upon further rotation of the wheel 54 the seed potato quarter in one of the pockets is emptied into the dispensing chute 90 while the others are retained, this being accomplished due to the shape of the opening 84 which is disposed between presser 104 and rollers 110 and is, in effect, formed of two apertures of different sizes. Upon slightly further rotation the seed potato in another pocket is discharged through another part of the opening 84.

Inasmuch as the device is essentially an attachment that is, a farmer may apply it to his own planter, the mounting for the various elements will probably differ from what is shown in the drawings to adapt the device for different standard makes of planters. An example of this is the plate 122 shown in Figures 1 and 4. This plate is arranged specifically to be used with the type of planter illustrated in Figure 1 and has the mounting bracket 102 connected thereto. It may well be that this plate would have to be of a different shape and size for other planters.

Having described the invention, what is claimed as new is:

1. An attachment for a potato planter including a frame, a wheel mounted on said frame for rotation about a horizontal axis, a container for holding a treating liquid mounted on said frame and concentrically encasing the lower portion of said wheel, the bottom of said container being closely adjacent and conforming to the curvature of said wheel, cutter blades dividing the rim of the wheel into bottomless compartments, a sleeve concentrically disposed within the periphery of the wheel adjacent the inner edges of said cutter blades forming a bottom for said compartments, said sleeve being fixedly attached to said frame and having an opening therein at the upper portion of said wheel through which seedlings drop from the compartments as the wheel is rotated, discharged means in registry with said opening for discharging seedlings from the wheel exteriorly of the container.

2. An attachment for a potato planter including a frame, a wheel mounted on said frame for rotation about a horizontal axis, a container for holding a treating liquid mounted on said frame and concentrically encasing the lower portion of said wheel, the bottom of said container being closely adjacent and conforming to the curvature of said wheel, cutter blades dividing the rim of the wheel into bottomless compartments, a sleeve concentrically disposed within the periphery of the wheel adjacent the inner edges of said cutter blades forming a bottom for said compartments, said sleeve being fixedly attached to said frame and having an opening therein at the upper portion of said wheel through which seedlings drop from the compartments as the wheel is rotated, discharge means in registry with said opening for discharging seedlings from the wheel exteriorly of the container, said wheel comprising a disc, said cutter blades being secured to one face of said disc and extending outwardly therefrom, a circular ring secured to the free ends of said blades in spaced parallel relation to said disc to thereby form said compartments.

3. The combination of claim 1, and means mounted on said frame for pressing the potatoes on the cutter blades to cut the potatoes and drop the seedling portions into the compartments.

4. The combination of claim 1, and a scraper carried by said container and being disposed adjacent the edges of said cutter blades to scrape across the tops thereof when said wheel rotates.

5. The combination of claim 1, said discharge means comprising a chute opening to one side of said container.

References Cited in the file of this patent

UNITED STATES PATENTS

| Number | Name | Date |
| --- | --- | --- |
| 957,118 | Snyder | May 3, 1910 |
| 1,238,893 | Dahleen | Sept. 4, 1917 |
| 1,503,612 | Taylor | Aug. 5, 1924 |
| 1,726,032 | Laughlin | Aug. 27, 1929 |
| 2,053,410 | Walker | Sept. 8, 1936 |
| 2,271,957 | Saiberlich | Feb. 3, 1942 |
| 2,342,122 | Cook | Feb. 22, 1944 |
| 2,343,496 | Carroll | Mar. 7, 1944 |
| 2,487,719 | Meyer | Nov. 8, 1949 |